(12) United States Patent
Nakamura et al.

(10) Patent No.: US 7,099,898 B1
(45) Date of Patent: Aug. 29, 2006

(54) DATA ACCESS SYSTEM

(75) Inventors: Lee Evan Nakamura, Morgan Hill, CA (US); Stewart Eugene Tate, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 09/637,381

(22) Filed: Aug. 11, 2000

Related U.S. Application Data

(60) Provisional application No. 60/148,558, filed on Aug. 12, 1999, provisional application No. 60/148,561, filed on Aug. 12, 1999, provisional application No. 60/148,500, filed on Aug. 12, 1999.

(51) Int. Cl.
*G06F 17/30* (2006.01)

(52) U.S. Cl. ............... 707/203; 717/165; 711/170

(58) Field of Classification Search ........... 707/1–10, 707/100–104.1, 200–205, 500, 513; 709/200, 709/201; 711/100, 104, 154, 163, 164, 170, 711/101; 717/100, 106, 108, 114, 116, 165; 715/500, 513
See application file for complete search history.

(56) References Cited

U.S. PATENT DOCUMENTS

| | | | |
|---|---|---|---|
| 4,763,250 A | 8/1988 | Keshlear et al. ........... 711/208 |
| 5,274,834 A | 12/1993 | Kardach et al. | |
| 5,465,353 A | 11/1995 | Hull et al. | |
| 5,555,388 A | 9/1996 | Shaughnessy | |
| 5,664,153 A * | 9/1997 | Farrell ........... 711/154 |
| 5,682,524 A | 10/1997 | Freund et al. ........... 707/5 |
| 5,692,178 A * | 11/1997 | Shaughnessy ........... 707/8 |
| 5,727,203 A | 3/1998 | Hapner et al. ........... 707/103 |
| 5,729,730 A | 3/1998 | Wlaschin et al. ........... 707/3 |
| 5,745,904 A | 4/1998 | King et al. | |
| 5,761,493 A * | 6/1998 | Blakeley et al. ........... 707/200 |
| 5,761,657 A | 6/1998 | Hoang | |
| 5,765,147 A | 6/1998 | Mattos et al. ........... 707/4 |
| 5,778,361 A | 7/1998 | Nanjo et al. ........... 707/5 |
| 5,802,524 A | 9/1998 | Flowers et al. ........... 707/103 |
| 5,809,497 A | 9/1998 | Freund et al. ........... 707/2 |
| 5,819,282 A | 10/1998 | Hooper et al. | |
| 5,835,907 A | 11/1998 | Newman | |
| 5,848,274 A | 12/1998 | Hamby et al. ........... 717/153 |

(Continued)

OTHER PUBLICATIONS

"Method for Extending Index and Segmentation", IBM Technical Disclosure Bulletin, vol. 40, No. 12, Dec. 1997.

(Continued)

*Primary Examiner*—Leslie Wong
*Assistant Examiner*—Harold E. Dodds, Jr.
(74) *Attorney, Agent, or Firm*—Sughrue Mion, PLLC

(57) ABSTRACT

An efficient technique for storing, updating, locating, and retrieving data is provided. In particular, data may be stored in a persistent, user-defined, shareable in-memory database table. Once this in-memory database table is created and loaded with data, data may be located in the table. When a search request specifying a number of results to be retrieved from a desired starting point is received, the data is located in an in-memory database table. Then, the specified number of results from a desired starting point are returned. Furthermore, data that is accessed via an in-memory database table is updated upon receiving an update request. The data that is updated may either be data in a data area of the in-memory database table or may be relational data. When data is updated, a high speed index used to access the in-memory database table is also updated.

30 Claims, 11 Drawing Sheets

U.S. PATENT DOCUMENTS

| | | |
|---|---|---|
| 5,864,857 A | 1/1999 | Ohata et al. |
| 5,864,877 A | 1/1999 | Henry et al. ............... 711/208 |
| 5,867,597 A | 2/1999 | Peairs et al. ............... 382/209 |
| 5,870,627 A | 2/1999 | O'Toole et al. ............... 710/22 |
| 5,873,083 A | 2/1999 | Jones et al. ................... 707/4 |
| 5,907,707 A | 5/1999 | Ramalingam et al. ...... 717/104 |
| 5,920,725 A | 7/1999 | Ma et al. ................... 395/712 |
| 5,926,807 A | 7/1999 | Peltonen et al. |
| 6,012,067 A * | 1/2000 | Sarkar ................... 707/103 R |
| 6,122,640 A * | 9/2000 | Pereira ...................... 707/100 |
| 6,151,624 A | 11/2000 | Teare et al. |
| 6,182,121 B1 | 1/2001 | Wlaschin |
| 6,202,063 B1 * | 3/2001 | Benedikt et al. ........ 707/103 R |
| 6,226,650 B1 | 5/2001 | Mahajan et al. |
| 6,226,728 B1 | 5/2001 | See et al. |
| 6,253,208 B1 | 6/2001 | Wittgreffe et al. |
| 6,304,867 B1 | 10/2001 | Schmidt |
| 6,360,215 B1 | 3/2002 | Judd et al. |
| 6,363,411 B1 * | 3/2002 | Dugan et al. ............... 709/202 |
| 6,366,926 B1 | 4/2002 | Pohlmann et al. |
| 6,390,374 B1 * | 5/2002 | Carper et al. ............... 235/492 |
| 6,418,214 B1 | 7/2002 | Smythe et al. |
| 6,424,966 B1 * | 7/2002 | Meyerzon et al. ............ 707/10 |
| 6,427,145 B1 | 7/2002 | Hara et al. |
| 6,457,021 B1 | 9/2002 | Berkowitz et al. |
| 6,769,019 B1 | 7/2004 | Ferguson |

OTHER PUBLICATIONS

Dessloch, S. et al., "Integrating SQL databases with content-specific search engines." Proceedings of the Twenty-Third International Conference on Very Large Databases, pp. 528-537, Published: San Francisco, CA, 1997, xvi+599 pp. Abstract.

Myka, A. et al., "Fuzzy full-text searches in OCR databases." Digital Libraries. Research and Technology Advances. ADL '95 Forum. Selected Papers, pp. 131-145, Published: Berlin, Germany, 1996, xiii+290 pp. Abstract.

Dik Lun Lee et al., "Efficient signature file methods for text retrieval." IEEE Transactions on Knowledge and Data Engineering, vol. 7, No. 3, pp. 423-435, Jun. 1995.

Shimizu, et al. (Trans. Of the Inst. Of Electronics, Information & Communication Eng. D-IU, pp. 24-32, Jan. 1999.

* cited by examiner

DATA ACCESS SYSTEM

REFERENCE TO PROVISIONAL APPLICATIONS

This application is a Continuation-In-Part application and claims the benefit of the following U.S. Provisional Applications:

U.S. Provisional Application No. 60/148,558, entitled "HIGH-SPEED, PERSISTENT, USER-DEFINED IN-MEMORY DATABASE TABLE," filed on Aug. 12, 1999, by Lee E. Nakamura, et al.;

U.S. Provisional Application No. 60/148,561, entitled "HIGH SPEED INDEX WITH STORED DESCRIPTOR(S) WHICH PROVIDES PRE-SORTED DATA," filed on Aug. 12, 1999, by Lee E. Nakamura, et al.; and U.S. Provisional Application No. 60/148,500, entitled "TEXT EXTENDER FAST PATH FRONT END TO COORDINATE INTERACTION WITH PERSISTENT IN-MEMORY DATABASE TABLE," filed on Aug. 12, 1999, by Lee E. Nakamura, et al.;

each of which is incorporated by reference herein.

FIELD OF THE INVENTION

This invention relates in general to computer-implemented systems, and, in particular, to accessing data efficiently.

BACKGROUND OF THE INVENTION

Databases are computerized information storage and retrieval systems. A Relational Database Management System (RDBMS) is a database management system (DBMS) which uses relational techniques for storing and retrieving data. Relational databases are organized into physical tables which consist of rows and columns of data. The rows are formally called tuples. A database will typically have many physical tables and each physical table will typically have multiple tuples and multiple columns. The physical tables are typically stored on random access storage devices (RASD) such as magnetic or optical disk drives for semi-permanent storage. Additionally, logical tables or "views" can be generated based on the physical tables and provide a particular way of looking at the database. A view arranges rows in some order, without affecting the physical organization of the database.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO).

The SQL interface allows users to formulate relational operations on the tables either interactively, in batch files, or embedded in host languages, such as C and COBOL. SQL allows the user to manipulate the data. The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of performing the query.

One way to optimize retrieval of data is to use an index. An index is an ordered set of references to the records or rows in a database file or table. The index is used to access each record in the file using a key (i.e., one of the fields of the record or attributes of the row). When data is to be retrieved, an index is used to locate records. Then, the data is sorted into a user-specified order and returned to the user. Additionally, if a join operation is involved, the join operation is performed prior to retrieving data and sorting. Although conventional indexes are useful, they are only useful in locating data. Next, the data must be retrieved from a data store (e.g., a database or file system).

It is typically very time consuming to retrieve data. The amount of time required to access data stored within databases and/or file systems is adversely affected by I/O (i.e., input/output) sub-system performance and cache designs. A cache is a high speed data storage mechanism that may be implemented as a portion of memory in a computer. Data that may be used more than once may be retrieved from a data store and stored in a cache for easy and quick access. Current cache designs do not guarantee that desired data will be present in memory when needed. When desired data is not in a cache, additional time is required to retrieve data from I/O sub-systems. This causes delays and fluctuations in access times needed to retrieve desired data.

FIG. 1 is a diagram illustrating a basic data store design using a non-persistent cache area. A user submits search requests 100, which are forwarded to a search engine 102. A search request 100 is, for example, a SQL query. The search engine 102 attempts to locate the data in the relational non-persistent cache 104. The term "non-persistent" indicates that the cache 104 in this example is non-persistent (i.e., the data is stored temporarily). If the search engine 102 locates the data in the relational non-persistent cache 104, the search engine 102 retrieves the data and returns search results 112. If the search engine 102 does not locate the data in the relational non-persistent cache 104, the search engine 102 uses the relational index 106 to retrieve relational data 110 from a data store and return search results 112. Therefore, some of the search results 112 may be provided from relational non-persistent cache memory, but this is not guaranteed. The relational non-persistent cache 104 is limited in size. Also, the relational index 106 and relational data 110 are located on magnetic media, and so I/O resources are needed to access this data. The relational data 110 may be in the form of a file.

There are many disadvantages to using this technique. In particular, the relational non-persistent cache typically contains data that has been received in response to prior requests for data. In many cases, users submit requests for data that was not recently received. In these cases, the data is retrieved from the basic data store. Accessing data from this basic data store typically uses up system resources for I/O. This conventional system has performance, capacity and cost issues as data stores and user load increase in size.

Thus, there is a need in the art for an improved technique of storing, updating, locating, and retrieving data.

SUMMARY OF THE INVENTION

To overcome the limitations in the prior art described above, and to overcome other limitations that will become apparent upon reading and understanding the present specification, the present invention discloses a method, apparatus, and article of manufacture for storing, updating, locating, and retrieving data.

According to an embodiment of the invention, data is stored in a persistent, user-defined, shareable in-memory database table. Once this in-memory database table is created and loaded with data, data may be located in the table.

In another embodiment of the invention, a search request specifying a number of results to be retrieved from a desired starting point is received. Data is located in an in-memory database table. Then, the specified number of results from a desired starting point are returned.

In yet another embodiment, data is retrieved from an in-memory database table by retrieving stored descriptors corresponding to search terms in the search request. The stored descriptors are mapped to location information in a header area of an in-memory database table. Using the location information, data is retrieved either from a data area of an in-memory database table or from a relational data store.

In a further embodiment, data that is accessed via an in-memory database table is updated upon receiving an update request. The data that is updated may either be data in a data area of the in-memory database table or may be relational data. When data is updated, a high speed index used to access the in-memory database table is also updated.

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Client/Server Architecture

Figure 1:
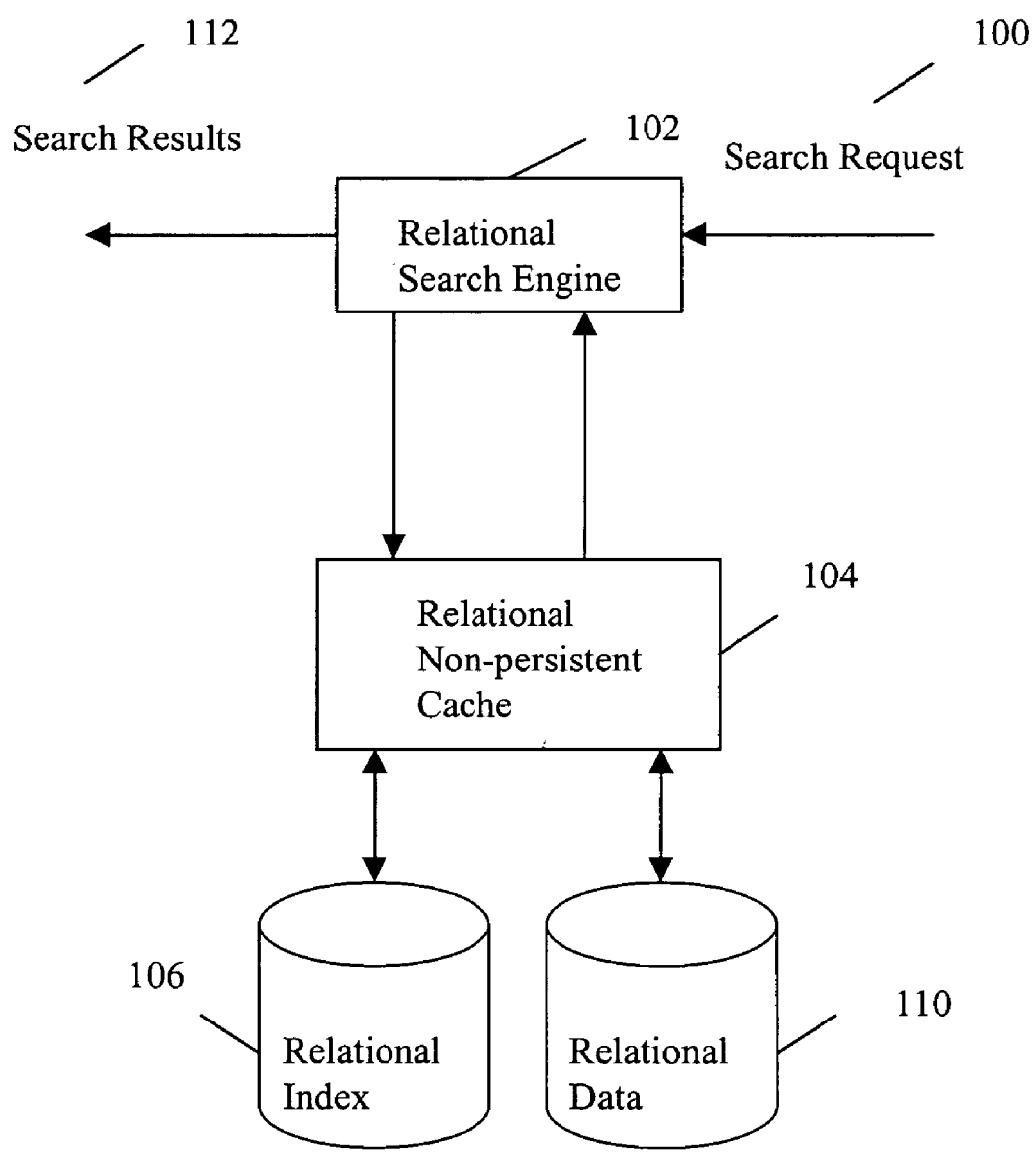
FIG. 1 is a diagram illustrating a basic data store design using a non-persistent cache area.
Figure 2:
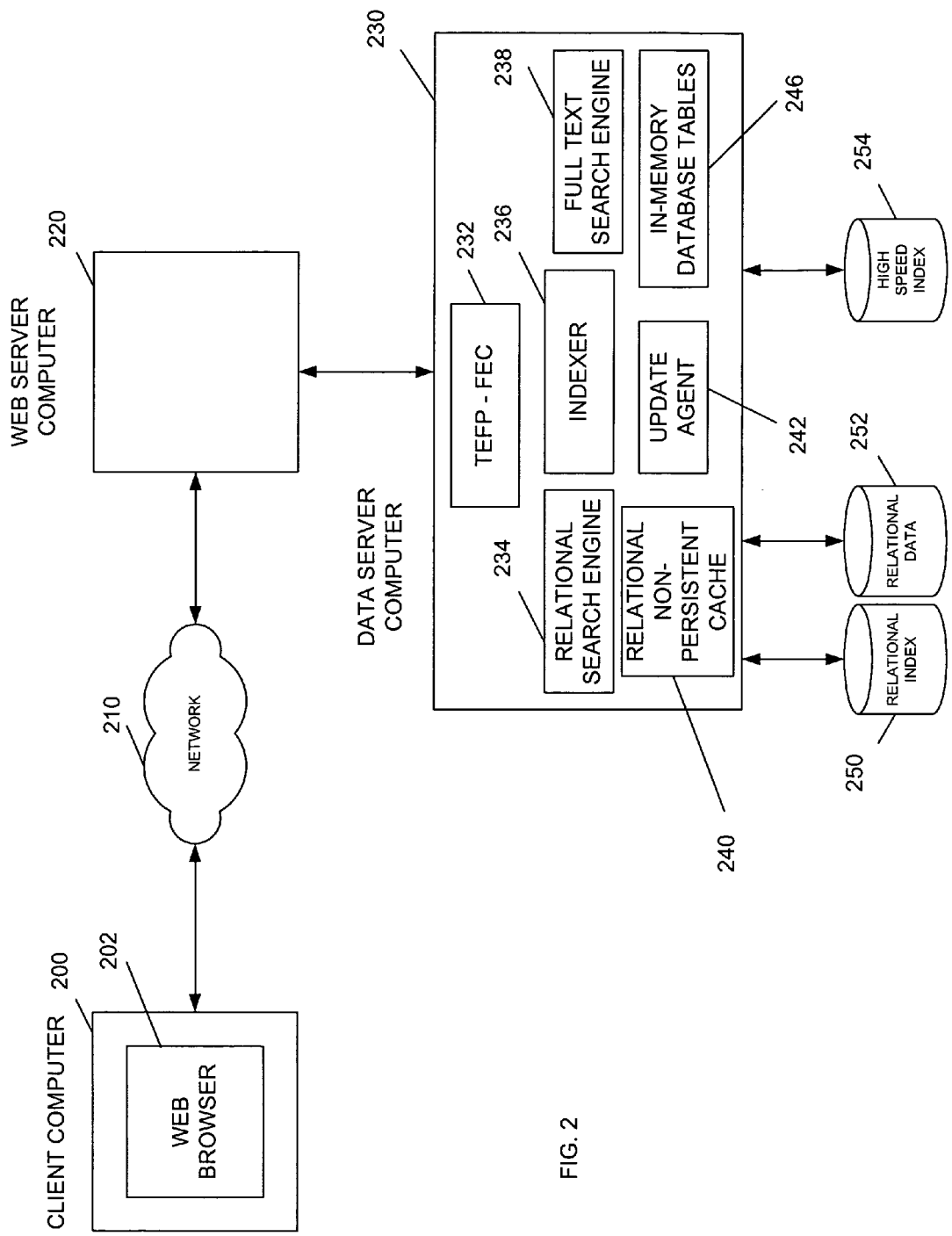
FIG. 2 is a diagram illustrating a client/server architecture and components of the invention.

FIG. 2 is a diagram illustrating a client/server architecture and components of the invention. A client computer 200, executing client computer programs, is connected to a web server computer 220 executing computer programs, via a network 210. The network 210 also connects the Web server computer 220 to a Data server computer 230, and also connects the server computers 220 and 230 to data stores. In one embodiment the network 210 comprises the Internet.

The Internet is a collection of computer networks that exchange information via Hyper Text Transfer Protocol (HTTP). Via its networks, the Internet computer network enables many users in different locations to access information stored in data stores (e.g., databases) stored in different locations.

The World Wide Web (i.e., the "WWW" or the "Web") is a hypertext information and communication system used on the Internet computer network with data communications operating according to a client/server model. Typically, a Web client computer will request data stored in data stores from a Web server computer. One or more computer programs at the Web server computer interact with an interface, which is connected to the data stores. These computer programs at the Web server computer will retrieve data and transmit the data to the client computer. The data can be any type of information, including database data, static data, HTML data, or dynamically generated data.

A web site is a location on the Web. A web site may have one or more web pages. A web page is a document with a unique Uniform Resource Locator (URL). Typically, the first page of a web site is referred to as its home page. A Web browser, which is a computer program, is used to locate and retrieve web pages. With the fast growing popularity of the Internet and the World Wide Web (also known as "WWW" or the "Web"), there is also a fast growing demand for accessing data via the Web.

A typical combination of resources may include client computers 200 that are personal computers or workstations, and server computers 220 and 230 that are personal computers, workstations, minicomputers, or mainframes. These systems are coupled to one another by various networks, including LANs, WANs, SNA networks, and the Internet. Each client computer 200 and server computer 220 and 230 additionally comprise an operating system and one or more computer programs.

A client computer 200 typically executes a client application, such as a Web browser 202. A Web server computer 220 typically executes Web server computer programs, which, for example, routes requests from the client computer 200 to the Data server computer 230. The Data server computer 230 includes a number of components that work together to store, locate, and retrieve data. The components are: a TEFP-FEC 232, a relational search engine 234, an indexer 236, a full text search engine 238, a relational non-persistent cache 240, an update agent 242, and an in-memory database table 246. The Data server computer 230 uses a data store interface to connect to data stores that store, respectively, a relational index 250, data 252 (e.g., text data), and a high speed index 254. For ease of discussion, all of these components at the Data server 230, along with the data stores connected to Data server 230, will be referred to as the TEFP-FEC system. The TEFP-FEC system provides an efficient technique for storing, updating, locating, and retrieving data. The TEFP-FEC system is especially useful for performing high speed text searches on large amounts of data via the Internet.

The TEFP-FEC 232 can search for and extract key information from documents stored in a RDBMS or stored in files outside the control of the RDBMS that contain a specific word (e.g., "cars"); search for documents that contain similar-sounding words; make a "fuzzy" search to find words that are spelled in a similar way to the search term; make a free-text search (i.e., describe the subject to be searched for as a natural language phrase or sentence); search for documents that contain synonyms of a word or phrase (e.g., "cars" and "automobiles"); search for documents that contain words in any sequence or words in the same sentence or paragraph (e.g., search for "cars" in same sentence as "engines"); and, perform wildcard searches using word and character marking; search for documents by variations of a word (e.g., its plural form).

The full text search engine 304 is a component of the TEFP-FEC that enables searching text in documents. For example, a database of books may be a database storing documents, with each document corresponding to a book. If a user wanted to search for books on cars, the full text search engine 304 could search the documents for the term "car" and retrieve information (e.g., titles and authors) about the books having the "term" car in them.

The relational search engine 234 is, for example, a RDBMS. The relational search engine 234 enables searching for data in a relational database. The relational database can be an existing database or a new database. In particular, the relational search engine 234 retrieves relational data 252 using a relational index 250. The data may be stored temporarily in a relational non-persistent cache 240. Relational data 252 can be retrieved and stored in the in-memory database table 246 or there can be links from the in-memory database table 246 to the relational data 252.

In one embodiment, the in-memory database table 246 has header and data areas. A header area stores links to the in-memory database table data area, and, if the in-memory database table 246 is used to link to relational data 252, the header area includes links to the relational data 252.

The high speed index 254 stores an index to the data in the in-memory database table 246 and to the relational data 252. In particular, the full text search engine 238 works in conjunction with the indexer 236 to obtain information to build the high speed index 254. The indexer 236 accesses information from both the relational search engine 234 and the in-memory database table 246 and passes this on to the full text search engine 238. In particular, if the relational data 252 and/or the in-memory database table 246 store data on books, and a user desired to index on authors and titles, the high speed index 254 will have columns for authors and titles. The indexer 236 retrieves the authors and titles of books, as well as location information (e.g., row identifiers) from the relational data 252 and/or the in-memory database table 246. The location information is stored in the in-memory database table 246, for example, in its header area. The indexer 236 generates a stored descriptor (i.e., a document identifier) for each document that has an entry in the high speed index 254. When accessing data, the stored descriptor is mapped to location information in the in-memory database table 246, for example, in its header area. The location information provides a link to either the relational data or the in-memory database table data area.

The client computer 200, the Web server computer 220, and the Data server computer 230 are bi-directionally coupled over a line or via a wireless system. In turn, the Data server computer 230 is bi-directionally coupled with data stores 246, 250, 252, and 254.

The operating system and computer programs at the client computer 200 and server computers 220 and 230 are comprised of instructions which, when read and executed by the client and server computers 200, 220, and 230, cause the client and server computers 200, 220, and 230 to perform the steps necessary to implement and/or use the present invention. Generally, the operating system and computer programs are tangibly embodied in and/or readable from a device, carrier, or media, such as memory, other data storage devices, and/or data communications devices. Under control of the operating system, the computer programs may be loaded from memory, other data storage devices and/or data communications devices into the memory of the computer for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 2 is not intended to limit the present invention. Indeed, those skilled in the art will recognize that other alternative hardware environments may be used without departing from the scope of the present invention.

High-speed, Persistent, User-Defined, Shareable in-Memory Database Table

One embodiment of the present invention provides a high-speed, persistent, user-defined in-memory database table. This embodiment enables a user, such as a database administrator (DBA), to create a user-defined, persistent, shareable in-memory database table. The created table is user-defined in that a user can create the table to desired specifications (e.g., with particular columns useful for the user). The created table is persistent in that it exists until it is explicitly dropped or until the system on which the table resides is shut down. In one embodiment, at system shut down, the system clears the memory in which the in-memory database table resides. In another embodiment, the invention drops the in-memory database table. The created table is shareable in that many users (i.e., all system users) can access the table. The created table is stored in-memory, for easy and efficient access to data.

An individual (e.g., DBA) is allowed to place desired data into the in-memory database table. Additionally, the in-memory database table can accept data from and link to existing data stores. For example, if data is stored in a conventional data store, the in-memory database table can link to that conventional data store. Thus, the in-memory database table is advantageous in that it does not require changes to existing data storage systems.

Furthermore, the embodiment of the invention provides a technique that guarantees that desired data is always present in memory. Using this embodiment of the invention, users can create and place data into one or more persistent in-memory database tables. Then, desired data is accessed from memory, avoiding input/output (I/O) processing associated with retrieving data from a data storage device. Additionally, use of the in-memory database table reduces the time required to access desired data. In particular, data is maintained in high-speed in-memory database tables for fast access.

The embodiment of the invention also provides uniform access times. In-memory database table access times do not contain random input/output (I/O) sub-system latency, providing highly uniform access duration. Access times to data stored in in-memory database tables is greatly reduced when compared to current non-persistent cache designs, and I/O sub-system access. Testing has shown a significant positive effect on searches conducted against one or more in-memory database tables.

For example, an Internet site may allow a user to access a large amount of data. An Internet site for an encyclopedia may have millions of pieces of data that could be searched. Internet sites can be designed to use in-memory database tables to search for and retrieve data. This will provide large performance and capacity improvements, which in turn leads to consumer satisfaction with the Internet site. In particular, OS Shared Memory and a "space saving" memory storage design is used to reduce system resource requirements of this invention. The indexer 232 scans data from in-memory database tables 246 and the high speed index 252 and saves system resources by removing white space and compressing data.

The following pseudo command-syntax is provided as an example statement to create an in-memory database table:

ENABLE TEXT COLUMN <table> <text-column>
    INDEX <index>
    USING <key column>
    [TAGS (tag, . . . )]
    [OPTIMIZE ON <(opt-column, . . . )>]
    [ORDER BY <order-column % ASC or DESC %>, . . . ]
    [DIRECTORY <directory> [TEMP DIRECTORY <temp directory>]]
    [DATABASE <database> [USER <user> USING <password>]]

In the above syntax, the words with capitalized letters (e.g., ENABLE, TEXT, COLUMN) are required terms. The terms enclosed in arrows ("< >") are parameters (e.g., table) that are supplied when the command syntax is used. The percent signs ("%") indicate selection of one of the items between the percent signs (e.g., ASC or DESC). The brackets ("[ ]") denote items that are optional. In order to create an in-memory database table, a new clause, the OPTIMIZE ON clause, is used, as will be described in further detail below.

In particular, the ENABLE TEXT COLUMN command builds an index (on, for example, a disk, rather than computer memory) for a table having a text column. A text column is a column containing text items, such as documents. The documents may be stored directly in the column or may be accessed via pointers in the column. One skilled in the art would recognize that the text items may be stored/accessed in other ways. The index being built is the high speed index 254. Furthermore, the index being built is an inverted index, which is an index that identifies unique words in the documents in a specified text column of a table and stores their positions in documents, their frequency of occurrence, and other data. The index does not store the documents themselves. The index does, however, store stored descriptors (that are generated by the indexer 236). That is, when the high speed index is created, a stored descriptor is generated for each document that is retrieved. Note that one row of a table with a text column stores a document. Stored descriptors are used to "index" into a header area of the in-memory database table. Then, the header area is used to locate a row in a data area of the in-memory database table.

When the index is being created, if the OPTIMIZE ON clause is specified, an in-memory database table is built, having the columns specified in the clause via the opt-column parameter. Thus, as data is retrieved to build the index, data may also be retrieved to build the in-memory database table. Note that, in some cases, the data retrieved may be used for both the index and the in-memory database table.

Referring back to the syntax, the ENABLE TEXT COLUMN <table><text-column> clause indicates that a specified text-column of a specified table is to be enabled. An enabled text column is one that may be searched via an index. The ENABLE TEXT COLUMN command is executed only for users using user identifiers ("user IDs") that have one of the following privileges as to the table for which the index is to be built:

ALTER privilege
SELECT privilege
UPDATE privilege

The table parameter, <table>, specifies the name of a text table in a connected database that contains the text column to be enabled. The table name must include an explicit schema name (qualifier), unless the schema name is the same as the user ID. The table parameter may specify a view or other object. For example, if a view is created by joining two tables, the table parameter may specify the view. Then, the in-memory database table is created to store data that is stored in the view. When data is retrieved from the in-memory database table, it is retrieved "pre-joined".

The text-column parameter, <text-column>, specifies the name of the column to be enabled. In one embodiment, this column must be of the type CHAR, VARCHAR, LONG VARCHAR, or CLOB.

The INDEX <index> clause specifies an index. The index parameter, <index>, specifies a name to be given to the index. In one embodiment, the name must be unique in the specified directory and not longer than 8 characters. This index is the high speed index 254.

The USING <key column> clause specifies a name of a key column of the table that is to be used to establish a relation between the indexed documents and the database rows. The key column is part of the in-memory database table (and not part of the index). In one embodiment, the key column parameter, <key column>, must be of type INT, CHAR, VARCHAR, or TIMESTAMP, and it must be a unique key on the table. However, if searching is to be performed only on the in-memory database table, the key does not have to be unique. Note that the contents of the key-column are held in an in-memory database table, while the index is activated. If the width of the key column is very large, it may run into system limitations.

The TAGS (tag, . . . ) clause is optional and allows for the names of up to five tags to be specified in the documents to support sections. If the format of the documents looks as follows:

xtitlex Document Title . . .
xbodyx Main text of document . . .
xfooterx Some footer information . . .

where there is a space after the tags xtitlex, xbodyx, and xfooterx, and there are two blank lines separating each section, then the TAGS clause of the command would look as follows:

... TAGS (xtitlex, xbodyx, xfooterx)

The get index status command may be used to obtain a list of the tags specified during the creation of an existing index.

The OPTIMIZE ON<(opt-column, . . . )> specifies the columns of the in-memory database table. In one embodiment, the OPTIMIZE ON<(opt-column, . . . )> is required in order for an in-memory database table to be created. In one embodiment, up to 22 columns may be held in an in-memory database table of the database server. This enables a stored procedure to retrieve the columns in a result table without accessing the original database table. This feature is an important contributor to the high search performance of the TEFP-FEC 232. In one embodiment, to take advantage of this feature, a dataSource parameter of a textSearch stored procedure is set to 0 when issuing a search. Otherwise, the results are retrieved from the database, rather than the in-memory database table.

Instead of specifying an existing table column, an SQL expression can be specified. Any expression allowed in the SELECT clause of an SQL query may be specified on the table containing the documents to be indexed.

For example, the following command creates an additional index for the sample table db2nx.sample, which is created by the sample program nxsample:

db2nx "ENABLE TEXT COLUMN db2nx.sample comment

INDEX sample

USING docid

OPTIMIZE ON (title, {SUBSTR(comment, 1,30) as commentheader})"

In one embodiment, an SQL expression must be surrounded by braces { }.

The ORDER BY <order-column % ASC or DESC %> clause is optional and specifies one or more columns used to specify a sequence during indexing so that documents can be retrieved from the index in sorted order. When retrieving data from a database, rather than from the in-memory database table, this order is used during a search to return the results in the requested order. When data is retrieved from the database in this order, the in-memory table is populated in this order. Then, when the in-memory table is searched, data that is retrieved from the in-memory table is organized in this order (i.e., it is "pre-sorted").

The DIRECTORY <directory> clause is optional and specifies a directory where the index is to be stored. If a directory is not specified, a default directory (e.g., db2nx/indices) is used.

The TEMP DIRECTORY <temp directory> clause is optional and specifies a directory where temporary index files are to be stored. In some systems (e.g., Unix® systems), if a directory is not specified, the default directory/tmp is used. In other systems, (e.g., Windows NT®), if a directory is not specified, the index directory is used.

The DATABASE <database> clause is optional and specifies a name of a database to be accessed. In one embodiment, if this parameter is not specified, a default database is used; in another embodiment, a value of an environment variable DB2 DBDFT is used.

The USER <user> USING <password> clause is optional. The USER <user> portion specifies a user ID of a database instance with database administrator authority for the database that contains the table. The USING <password> portion specifies a password for the database instance.

Figure 3:
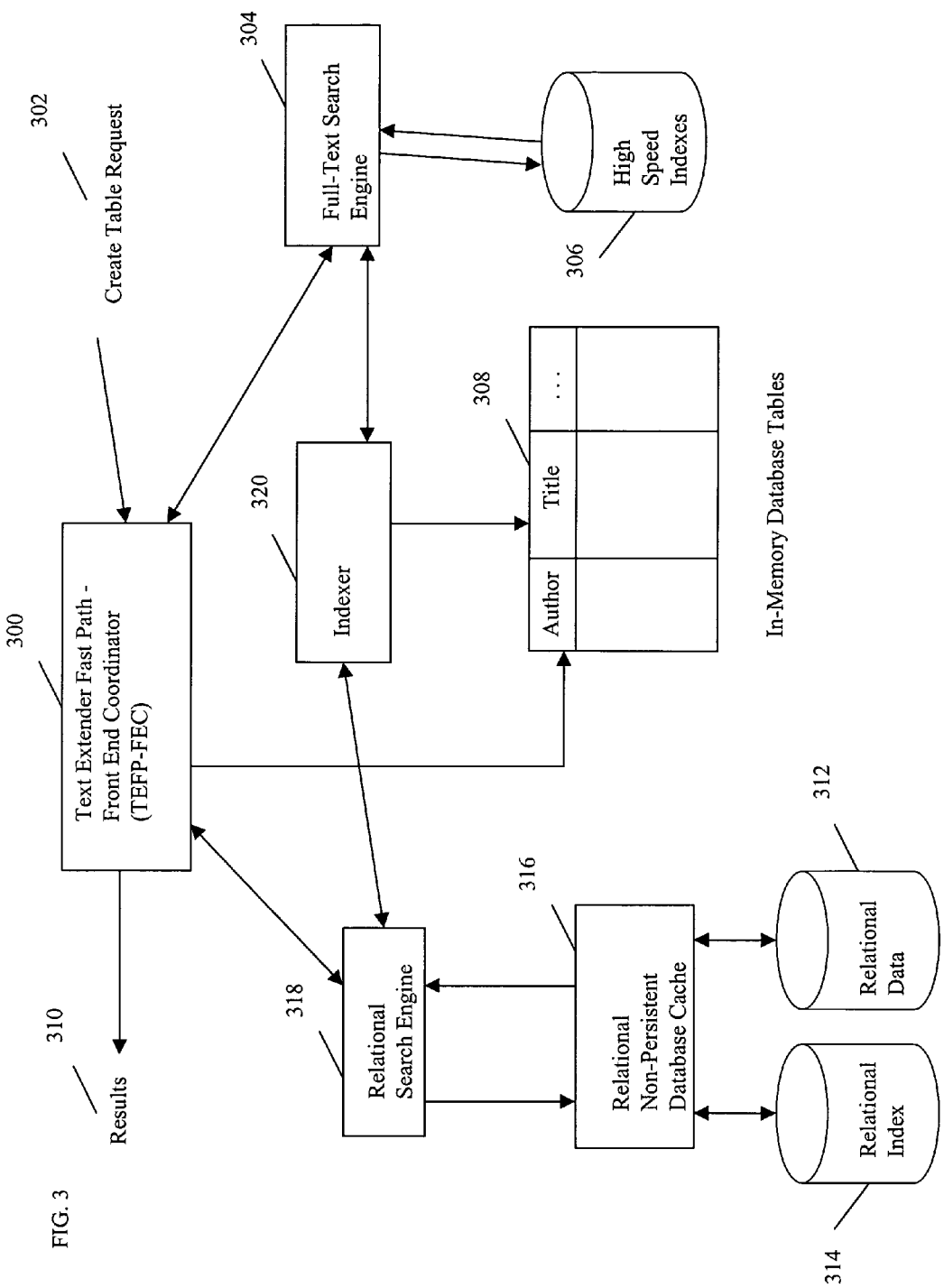
FIG. 3 is a diagram illustrating an architecture diagram of Text Extender Fast Path, which contains one or more in-memory database tables.

The embodiment of the invention allows a user to define in-memory database tables, which guarantee high-speed access to select data. FIG. 3 is a diagram illustrating an architecture diagram of a Text Extender Fast Path-Front End Coordinator (TEFP-FEC) 300, which contains one or more in-memory database tables 308. Initially, the TEFP-FEC 300 receives a request 302 to create an in-memory database table 308. When creating the in-memory database table 308, the user identifies data to be indexed. The indexer 320 sends the column to be indexed to the full-search text engine for use in building a high speed index 306. Additionally, the indexer 320 builds the in-memory database table 308 with the indexed column, document identifiers, and other information. The indexer 320 can also map document identifiers to keys in the relational data 312 to fetch relational data 312 for loading into the in-memory database table 308.

Once the in-memory database table 308 is created, it is populated. The user (e.g., DBA) specifies the data to be stored into the in-memory database table 308 via the OPTIMIZE ON clause. The data is then loaded into the in-memory database table 308. As the data is being loaded in, or in some cases just before it is loaded in, the full-text search engine 304 builds a high speed index 306. The full text search engine 304 receives data from the indexer 320 for the high speed index 306. The indexer 320 accesses information from the relational search engine 318 to populate the in-memory database table 308. Additionally, the indexer 320 accesses information (i.e., rows) from the relational search engine 318 and passes this on to the full text search engine 304 for the high speed index 306. In particular, if the relational data 312 stores data (e.g., authors and titles) on books, and a user desired to index on authors and titles, the high speed index 306 can have knowledge of fields containing this information for each document. The indexer 320 retrieves the authors and titles of books, as well as location information (e.g., row identifiers) from the relational data 312 and/or the in-memory database table 308. The location information is stored, for example, in the in-memory database table 308. The indexer 320 generates a stored descriptor (i.e., a document identifier) for each document that has an entry in its index 306. When accessing data, the stored descriptor is mapped to location information in the in-memory database table 308. The location information provides a link to either the relational data or the in-memory database table.

Once data is loaded into the in-memory database table 308, the data can be retrieved and/or updated. For example, if the TEFP-FEC 300 receives a request inquiring about books on cars, the TEFP-FEC 300 calls the full text search engine 304 to retrieve stored descriptors from the high speed index 306 that match the request. The full text search engine 304 returns a user-defined number of pre-sorted and/or pre-joined results beginning at a user-defined position within the result set. The TEFP-FEC 300 uses the returned stored descriptors from the high speed index 306 to locate data in the in-memory database table 308. Then, pre-sorted and/or pre-joined results 310 are returned to the user.

Additionally, the in-memory database table 308 can be linked to a traditional data store 312. The traditional data store 312 may be indexed via an index 314. The data from data store 314 may be stored in a non-persistent database cache 316 after being located by a search engine 318, such as a RDBMS. The TEFP-FEC 300 may use the stored descriptors from the high speed index 306 to retrieve data from data store 312 via the relational search engine 318 and store the data into the in-memory database table 308. Then, in subsequent requests for the data, the data can be retrieved from the in-memory database table 308.

Currently, most data stores (e.g., databases, file systems) contain some type of cache that is located in memory. However, in-memory database tables of the invention differ in the following ways:

a. Users can select what data will be placed and kept in the in-memory database table.
b. In-memory database tables can be accessed (e.g., read, write, update, search).
c. In-memory database tables are persistent, and once created, they remain in memory until they are removed or the system is shut down.
d. In-memory database tables can be accessed/shared by all users on a system.
e. In-memory database tables provide access control to data (e.g., read-only, read/write). That is, access to the in-memory database table is limited.

Currently, data stores (e.g., databases and file systems) contain data that is stored on magnetic media. This data can be read, written, and searched. In-memory database tables work with data from existing data stores. Thus, a high-speed, user-defined, in-memory database table can contain data provided by these data stores. In-memory database tables do, however, differ in that access performance to data contained in an in-memory database table is faster than I/O sub-system access.

For example, searches of a web site may use an embodiment of the invention to search large amounts of data (e.g., three million rows of data). If a book search is done on the word "cars", the search results can be obtained by using the high speed index 306 to obtain stored descriptors for all entries in the in-memory database table 308 for books on cars. Then, the stored descriptors are used to locate particular entries in the in-memory database table 308. These entries regarding books about cars are displayed to a user.

Figure 4:
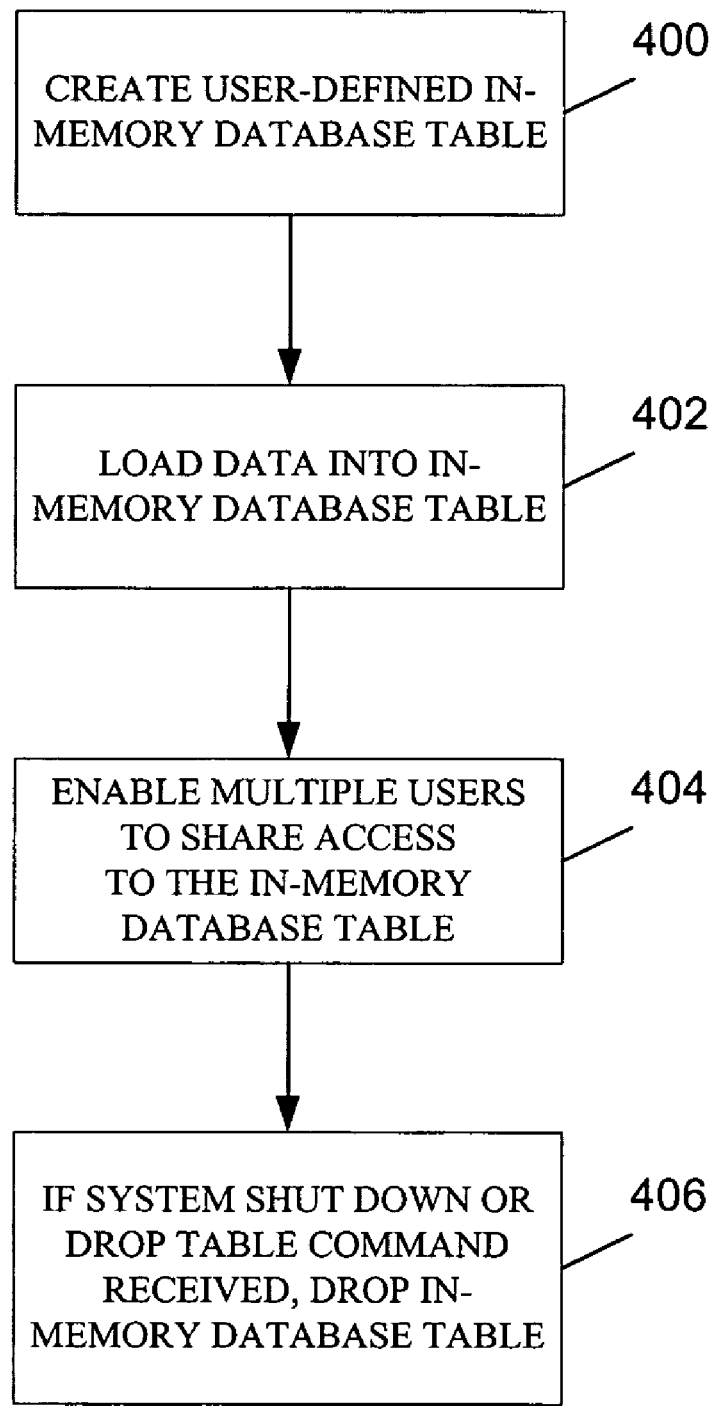
FIG. 4 is a flow diagram illustrating a process for creating an in-memory database table.

For ease of discussion with respect to FIG. 4, the components described in FIG. 3 will be collectively referred to as the TEFP-FEC system. FIG. 4 is a flow diagram illustrating a process for creating an in-memory database table. In block 400, a user-defined in-memory database table is created by the TEFP-FEC system. In block 402, the TEFP-FEC system loads data into the in-memory database table. In block 404, the TEFP-FEC system enables multiple users to share access to the in-memory database table. In block 406, if the system is shut down or a drop table command is received, the in-memory database table is dropped by the TEFP-FEC system, otherwise, the in-memory database table persists.

Text Extender Fast Path Front End to Coordinate Interaction with Persistent in-Memory Database Table One embodiment of the present invention provides a text extender fast path front end to coordinate interaction with persistent in-memory database table. In particular, the embodiment of the invention provides a Text Extender FastPath Front End Coordinator (TEFP-FEC) that allows a high-speed index to be searched and data retrieved from an in-memory database table or traditional data store (e.g., database or file system). A user is allowed to define to the front end coordinator (FEC) the number of search results desired and the position within the result set to begin retrieving results. Furthermore, the user can define to the front end coordinator a pre-sorted and/or pre-joined high-speed index to use. This allows the front end coordinator to use the stored descriptor(s) contained within the pre-sorted and/or pre-joined high speed index and return sorted and/or joined search results without requiring a sort or join operation at search time.

The TEFP-FEC, when used with one or more in-memory database tables and one or more high speed indexes with one or more stored descriptors, provides for fast text searches available on a network, such as the Internet, against large amounts of data.

Figure 5:
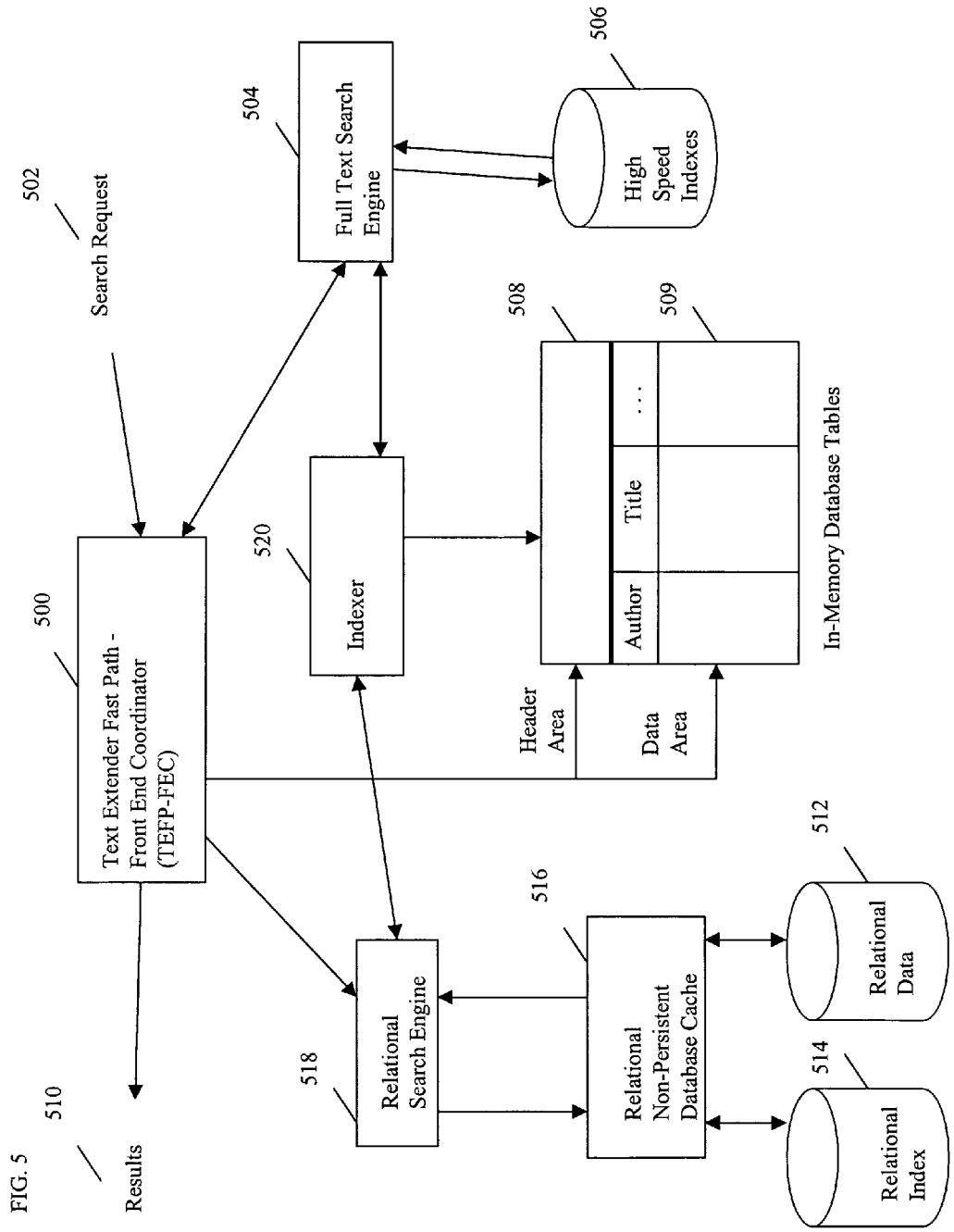
FIG. 5 is a diagram illustrating an architecture diagram of a TEFP-FEC used with a traditional data store, one or more in-memory database tables, and high-speed indexes with stored descriptors.

FIG. 5 is a diagram illustrating an architecture diagram of a TEFP-FEC used with a traditional data store, one or more in-memory database tables, and high-speed indexes with stored descriptors. Initially, the TEFP-FEC 500 receives a search request 502. The search request 502 is processed, and the full text search engine 504 API is called to retrieve one or more stored descriptors from a high speed index 506 that match the request. The full text search engine 504 API returns a user-defined number of pre-sorted and/or pre-joined results beginning at a user-defined position within the result set. The TEFP-FEC uses the returned stored descriptors from the high-speed index 506 to access the in-memory database table header 508. Based on data location information contained within the in-memory database table header 508, the TEFP-FEC retrieves data from the in-memory database table 509 or a traditional data store 512, 514, 516, and 518. The pre-sorted and/or pre-joined results 510 are returned to the user.

Additionally, the in-memory database table 508 can be linked to a traditional data store 512. The traditional data store 512 may be indexed via an index 514. The data from data store 514 may be stored in a non-persistent database cache 516 after being located by a search engine 518, such as a RDBMS. The TEFP-FEC 500 may use the stored descriptors from the high speed index 506 to retrieve data from data store 512 and store the data into the in-memory database table 508. Then, in subsequent requests for the data, the data can be retrieved from the in-memory database table 508.

The TEFP-FEC coordinates elements that provide a network, such as the Internet, high speed text searches on large amounts of data. Text searches on large amounts of data are being addressed in conventional systems by using traditional data stores and additional hardware resources. The conventional approaches have proven to have performance, capacity and cost issues as data stores and user load increase in size.

For example, searches of a web site may use an embodiment of the invention to search large amounts of data (e.g., three million rows of data). If a book search is done on the word "cars", the search results are displayed from an "in-memory database table" using stored descriptors and the TEFP-FEC.

Figure 6:
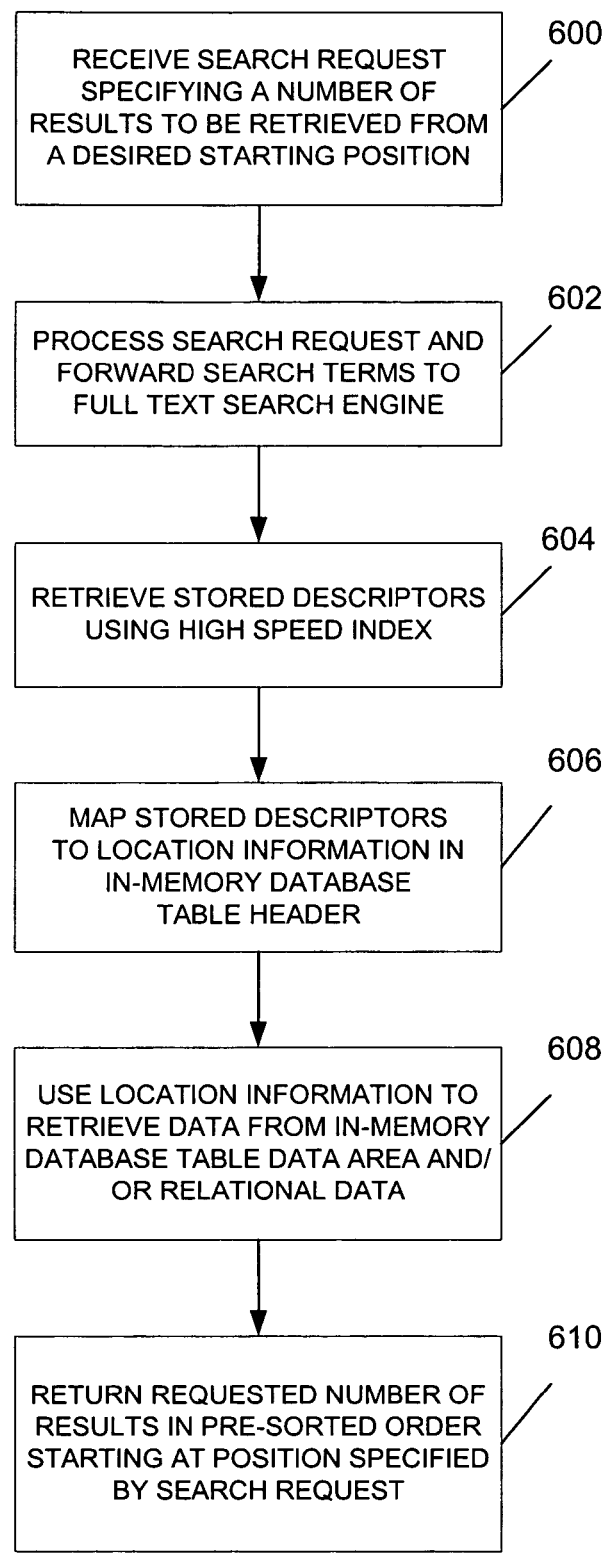
FIG. 6 is a flow diagram illustrating a process for using an in-memory database table.

For ease of discussion with respect to FIG. 6, the components described in FIG. 5 will be collectively referred to as the TEFP-FEC system. FIG. 6 is a flow diagram illustrating a process for using an in-memory database table. In block 600, the TEFP-FEC receives a search request specifying a number of results to be retrieved form a desired starting position. In block 602, the TEFP-FEC processes the search request and forwards search terms to the full text search engine. In block 604, the full text search engine retrieves stored descriptors based on the search terms using the high speed index and returns these to the TEFP-FEC. In block 606, the TEFP-FEC maps the stored descriptors to location information in the in-memory database table header. In block 608, the TEFP-FEC uses location information to retrieve data from the in-memory database table data are and/or relational data. In block 610, the TEFP-FEC returns a specified number of results in pre-sorted order, starting at a position specified by the search request, and the results may be pre-joined.

The invention provides high speed text searches that can be used on web sites. The invention works seamlessly with text data contained in a relational database. The invention is able to handle heavy text search demands of larger web sites. Customer defined data can be placed within in-memory database tables providing high speed data access. The invention is designed to rapidly search and index data without locking database tables. There is efficient use of system resources. The in-memory database tables represent an advantage over conventional search engines.

The invention provides high speed text search. Results of performance testing on 3M rows of data show an order of magnitude improvement in search performance. Load teasing was conducted using 91M hits per day without degradation in search performance. Additionally, the invention scales well.

The search capability includes: text search support, word or phrase searches, stemmed searches, Boolean operations, Fuzzy searches (i.e., misspellings), wildcard operations, and field or tag support. Boolean operation search performance is provided. The invention also provides a main memory database benefits to a traditional DBMS. This new technology augments traditional databases with the ability to have main memory storage with easy access.

The following table provides examples of single user search times. The results are from tests on a DB2®UDB® database against 3 million row table on S7A 12-way system with 32 GB of memory.

| SEARCH TERMS Field/Tag Searches | Search in a Relational Database | Search in an In-Memory Database Table |
| --- | --- | --- |
| Word Searches | | |
| Lion (1329 Count) | 00.012s | 00.007s |
| History (484876 Count) | 00.145s | 00.140s |
| General (914355 Count) | 00.174s | 00.160s |
| "General History" (271250) | 00.382s | 00.353s |
| "Wall Street" (1379 Count) | 00.048s | 00.038s |
| Fuzzy Searches 90% | | |
| Lion | 00.107s | 00.070s |
| History | 00.206s | 00.172s |
| General | 00.286s | 00.250s |
| "General History" | 00.483s | 00.453s |
| "Wall Street" | 00.144s | 00.113s |
| Wildcard Searches | | |
| Lio* | 00.051s | 00.014s |
| Hist* | 00.209s | 00.176s |
| G?neral | 00.202s | 00.174s |
| "wall st*" | 00.384s | 00.349s |
| "w?ll street" | 00.079s | 00.048s |
| "General Hi*" | 00.464s | 00.431s |
| "G?neral History" | 00.388s | 00.365s |

A High-Speed Index with One or More Stored Descriptors that Provides Pre-Sorted and/or Pre-Joined Data One embodiment of the present invention provides a high-speed index with one or more stored descriptors that are used to retrieve pre-sorted and/or pre-joined data. The table parameter may specify a view or other object. For example, if a view is created by joining two tables, the table parameter may specify the view. Then, the in-memory database table is created to store data that is stored in the view. When data is retrieved from the in-memory database table, it is retrieved pre-joined. Additionally, prior to creating a high speed index, data may be sorted based on a user-defined sort order, which is specified via the ORDER BY clause. One or more stored descriptors are generated. Each stored descriptor points to additional information about the data it refers to. Additionally, the stored descriptor acts as a document identifier. The sorted and/or joined data, along with the generated stored descriptors are used to create a high-speed index. When the high-speed index is searched, one or more stored descriptors are returned in the user-defined sort order. With the stored descriptors, a user-defined amount of data can be retrieved from one or more in-memory database tables or from another data store (e.g., a database, file system, etc. . . . ). Additionally, because the stored descriptors are returned in the user-defined sort order, the embodiment of the invention can retrieve data without requiring an additional sort operation. Also, because the in-memory database table may be built for a view or other database object that represents a join operation, the data in the in-memory database table is pre-joined, avoiding the need for performing a join operation.

When searched, the high speed index when returns one or more stored descriptors. Each stored descriptor points to additional information about the data it refers to. The information is maintained in a header area of an in-memory database table. The header area may contain some or all of the following information:

Location of data matching search request

Number of columns within matching row

Size of columns

Figure 7:
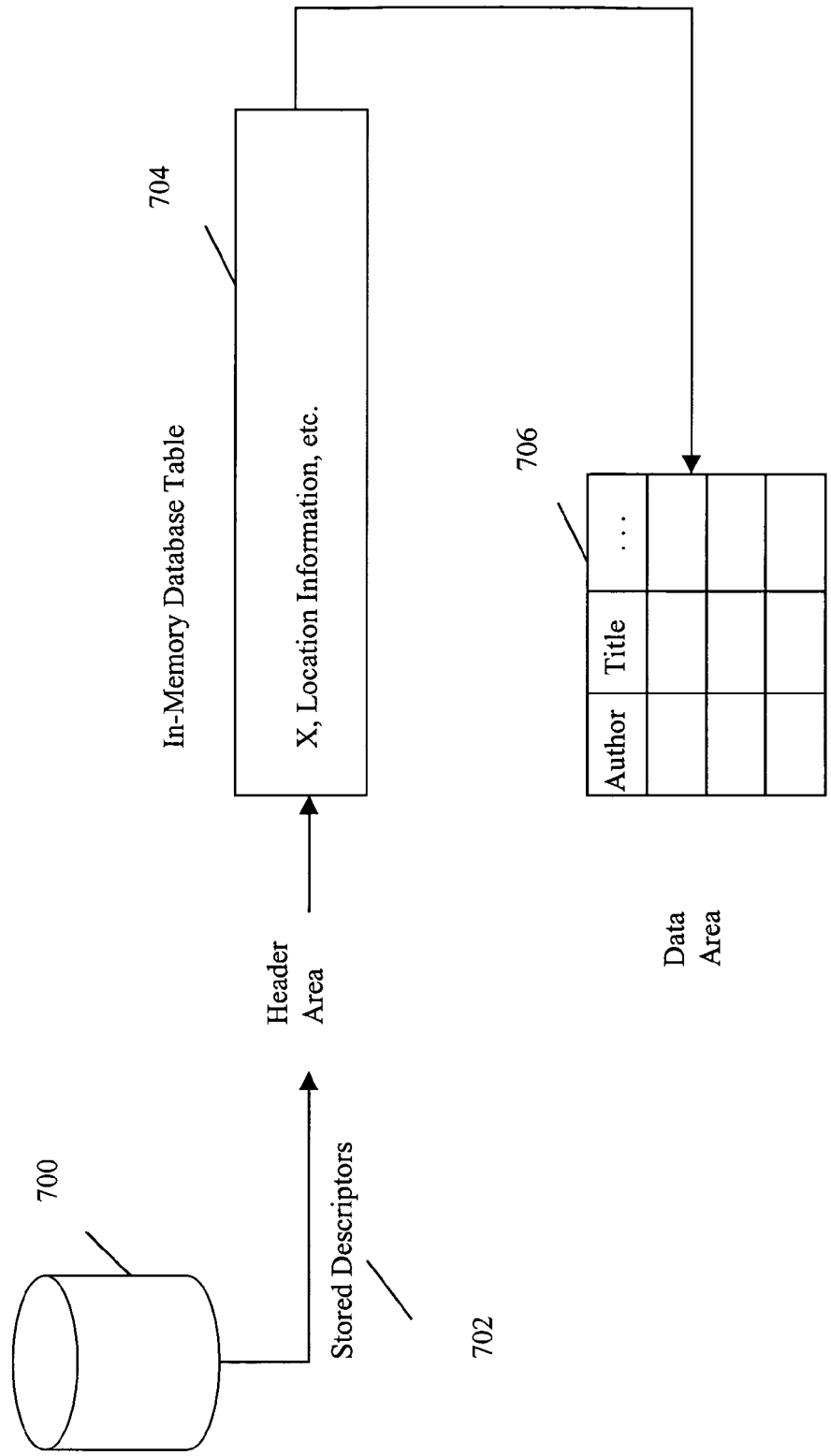
FIG. 7 is a diagram illustrating an architecture of a high-speed index with one or more stored descriptors referencing an in-memory database table.

FIG. 7 is a diagram illustrating an architecture of a high-speed index 700 with one or more stored descriptors 702 referencing an in-memory database table. In particular, stored descriptors 702 are retrieved using the high speed index 700. The stored descriptors are mapped to location information in the in-memory database table header area 704. The location information is used to access data in the in-memory database table data area 706.

Figure 8:
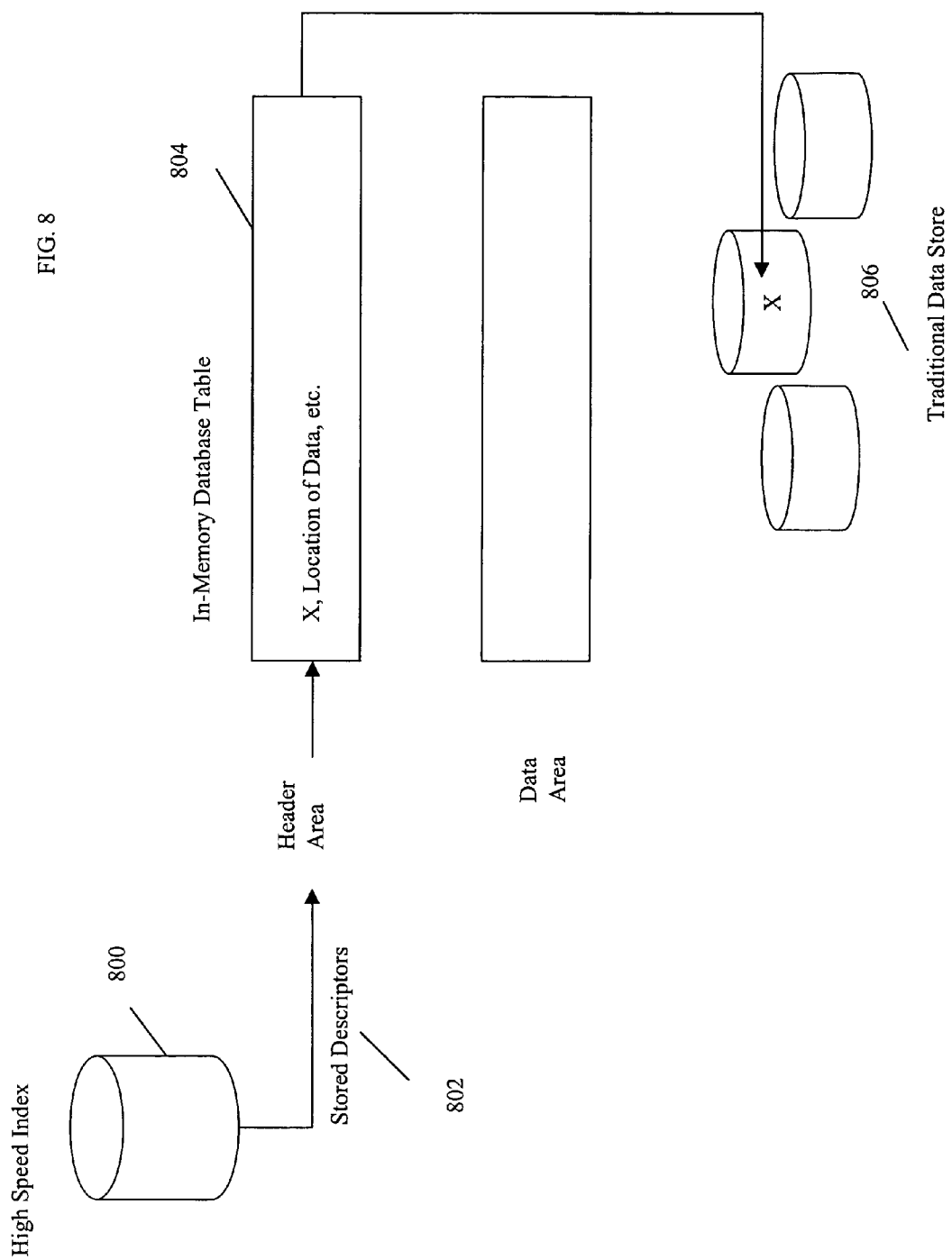
FIG. 8 is a diagram illustrating an architecture of a high-speed index with one or more stored descriptors referencing a traditional data store.

FIG. 8 is a diagram illustrating an architecture of a high-speed index 800 with one or more stored descriptors 802 referencing a traditional data store 806. In particular, stored descriptors 802 are retrieved using the high speed index 800. The stored descriptors are mapped to location information in the in-memory database table header area 804. The location information is used to access data in a traditional data store 806, such as a relational database.

Figure 9:
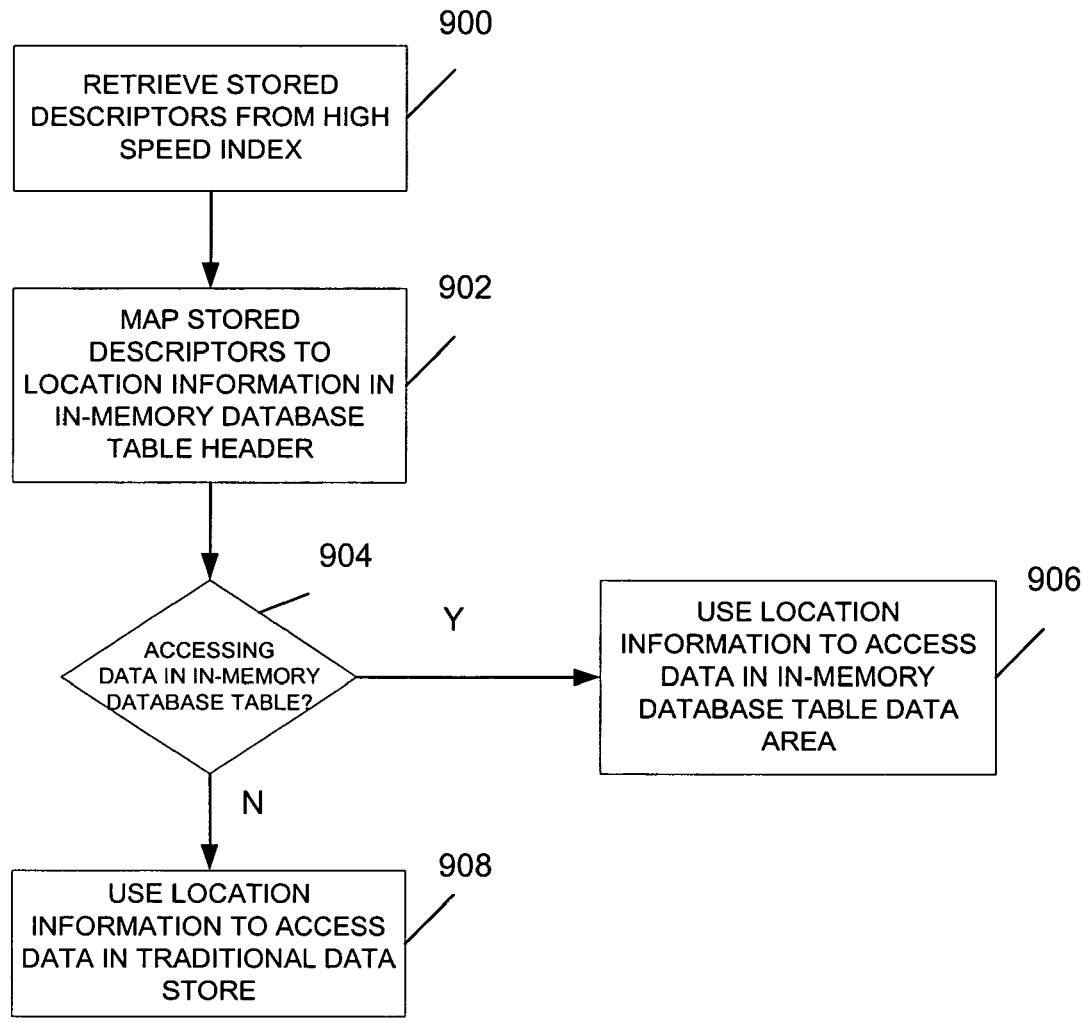
FIG. 9 is a flow diagram illustrating a process for using stored descriptors to index into an in-memory database table.

FIG. 9 is a flow diagram illustrating a process for using stored descriptors to index into an in-memory database table. In block 900, the TEFP-FEC system retrieves stored descriptors from the high speed index via the full text search engine. In block 902, the TEFP-FEC system maps the stored descriptors to location information in the in-memory database table header. In block 904, the TEFP-FEC system uses the location information to determine whether the data to be accessed is in the in-memory database table. If so, the TEFP-FEC system uses the location information to access data in the in-memory database table data area in block 906. Otherwise, in block 908, the TEFP-FEC system uses the location information to access data in the traditional data store.

Updating a High Speed Persistent, User-Defined in-Memory Database Table

One embodiment of the present invention provides a Text Extender FastPath Front End Coordinator (TEFP-FEC) that allows data to be updated that is accessed via an in-memory database table. The data that is updated may be data in a data area of the in-memory database table or may be data in a relational data store.

Figure 10:
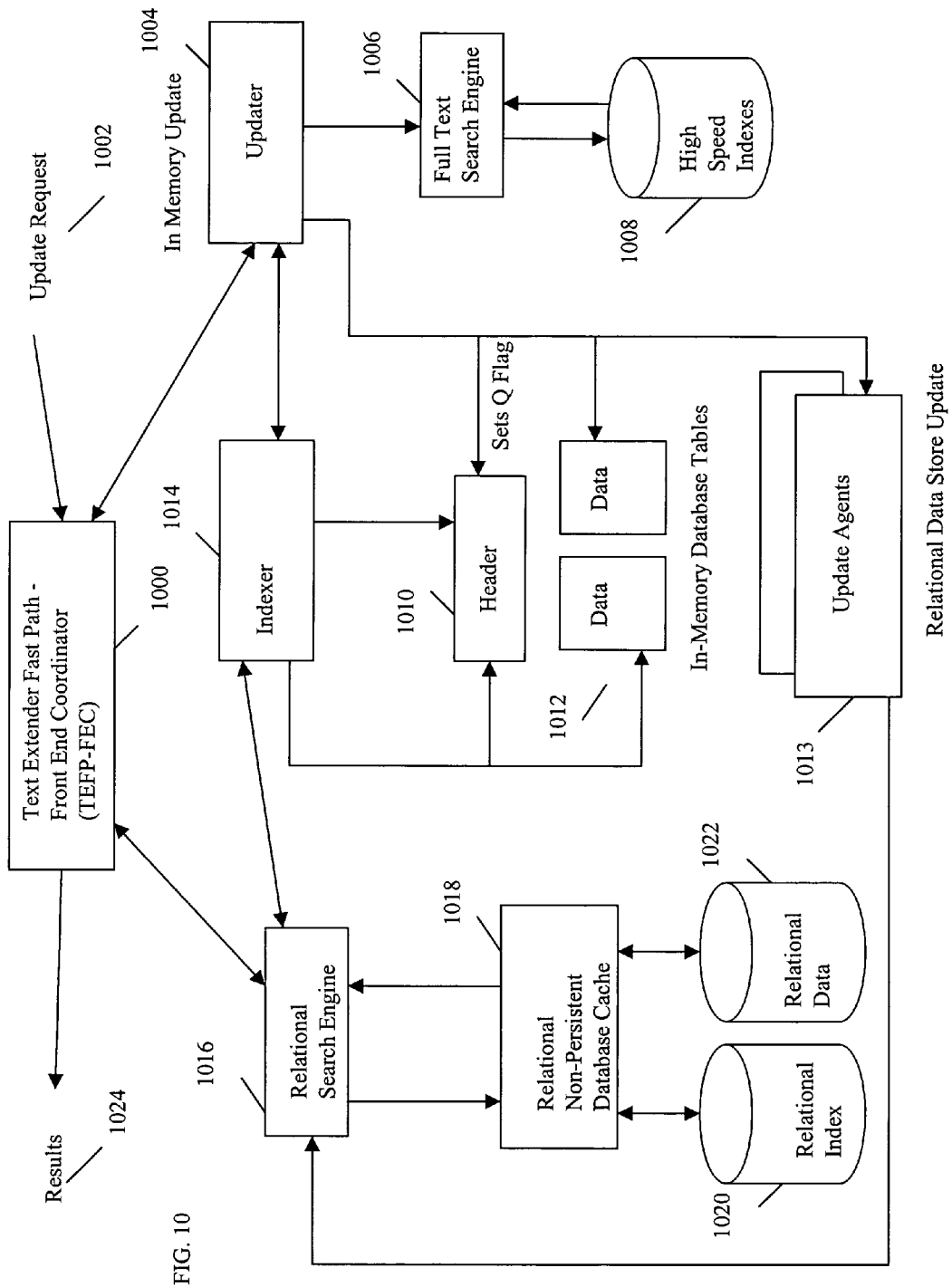
FIG. 10 is a diagram illustrating updating of one or more in-memory database tables.

FIG. 10 is a diagram illustrating updating of one or more in-memory database tables. When updating an in-memory database table, the TEFP-FEC 1000 receives an update request 1002. The TEFP-FEC 1000 processes (e.g., parses) the request and passes it on to the updater 1004. The updater 1004 updates the relational data store, the in-memory database tables, and the high speed indexes. The updater 1004 updates relational data 1022 by using update agents 1013 to access a relational search engine 1016. The relational search engine 1016 uses a relational index 1020 to locate and update relational data 1022.

The updater 1004 also updates the in-memory database table header area 1010 and data area 1012. In particular, the updater 1004 sets, for example, a Q Flag in the header area 1010 to indicate that data has been updated.

The updater 1004 works with the full text search engine 1006 to update the high speed index 1008, while the indexer 1014 provides updated index information to the full text search engine 1006. The results 1024 of the update may be returned (e.g., an indication that the update was successful).

Figure 11:
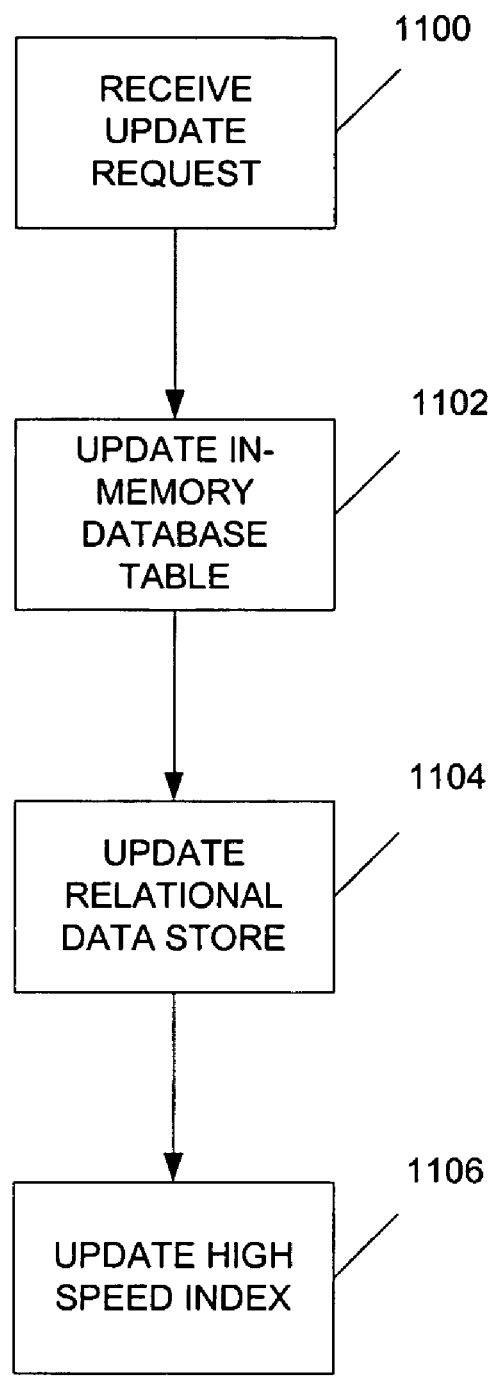
FIG. 11 is a flow diagram illustrating a process for updating an in-memory database table.

FIG. 11 is a flow diagram illustrating a process for updating an in-memory database table. In block 1100, the updater receives an update request from the TEFP-FEC. In block 1102, the updater updates the in-memory database tables. In block 1104, the updater updates the relational data store. In block 1106, the updater updates the high speed indexes.

CONCLUSION

This concludes the description of embodiments of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of embodiments of the invention have been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A method of storing data in a memory of a computer, comprising:
    creating a persistent in-memory database table; and
    loading data into the in-memory database table.

2. The method of claim 1, wherein the data is loaded from a relational data store.

3. The method of claim 1, wherein the in-memory database table is user-defined.

4. The method of claim 1, further comprising enabling multiple users to share access to the in-memory database table.

5. The method of claim 1, further comprising dropping the in-memory database table upon receipt of a drop table command.

6. The method of claim 1, further comprising dropping the in-memory database table upon system shutdown.

7. The method of claim 1, further comprising providing a syntax for creating the in-memory database table.

8. The method of claim 1, further comprising limiting access to the in-memory database table.

9. An apparatus for storing data, comprising:
    a computer having a memory and connected to a data store;
    one or more computer programs, performed by the computer, for creating a persistent in-memory database table and loading data into the in-memory database table.

10. The apparatus of claim 9, wherein the data is loaded from a relational data store.

11. The apparatus of claim 9, wherein the in-memory database table is user-defined.

12. The apparatus of claim 9, further comprising enabling multiple users to share access to the in-memory database table.

13. The apparatus of claim 9, further comprising dropping the in-memory database table upon receipt of a drop table command.

14. The apparatus of claim 9, further comprising dropping the in-memory database table upon system shutdown.

15. The apparatus of claim 9, further comprising providing a syntax for creating the in-memory database table.

16. The apparatus of claim 9, further comprising limiting access to the in-memory database table.

17. An article of manufacture comprising a program storage medium readable by a computer and embodying one or more instructions executable by the computer to store data in a memory of a computer, comprising:
    creating a persistent in-memory database table; and
    loading data into the in-memory database table.

18. The article of manufacture of claim 17, wherein the data is loaded from a relational data store.

19. The article of manufacture of claim 17, wherein the in-memory database table is user-defined.

20. The article of manufacture of claim 17, further comprising enabling multiple users to share access to the in-memory database table.

21. The article of manufacture of claim 17, further comprising dropping the in-memory database table upon receipt of a drop table command.

22. The article of manufacture of claim 17, further comprising dropping the in-memory database table upon system shutdown.

23. The article of manufacture of claim 17, further comprising providing a syntax for creating the in-memory database table.

24. The article of manufacture of claim 17, further comprising limiting access to the in-memory database table.

25. The method of claim 1, wherein the persistent in-memory database table remains in memory until a user specifies removal of said persistent in-memory database table.

26. The method of claim 1, wherein the data remains in the persistent in-memory database table after it is accessed by a first user and is available for access by a second user.

27. The apparatus of claim 9, wherein the persistent in-memory database table remains in memory until a user specifies removal of said persistent in-memory database table.

28. The apparatus of claim 9, wherein the data remains in the persistent in-memory database table after it is accessed by a first user and is available for access by a second user.

29. The article of manufacture of claim 17, wherein the persistent in-memory database table remains in memory until a user specifies removal of said persistent in-memory database table.

30. The article of manufacture of claim 17, wherein the data remains in the persistent in-memory database table after it is accessed by a first user and is available for access by a second user.

* * * * *